INVENTORS
FRANCIS B. BLACK
ELLIS D. HARRIS
BY
S C Yeaton
ATTORNEY

INVENTORS
FRANCIS B. BLACK
ELLIS D. HARRIS
BY
ATTORNEY

United States Patent Office 3,438,025

Patented Apr. 8, 1969

3,438,025

BINARY CODE CONVERTERS

Francis B. Black, Sandy, Utah, and Ellis D. Harris, Bradbury City, Calif., assignors to Sperry Rand Corporation, a corporation of Delaware Filed Nov. 26, 1965, Ser. No. 509,997
Int. Cl. H04l 3/00
U.S. Cl. 340—347 10 Claims This invention relates to code translation apparatus and specifically to apparatus for converting a number expressed in binary code to its equivalent in a different code.

Code converters employing saturable magnetic cores as decoding elements are well-known in the art. These decoders, however, require the use of a large number of magnetic cores.

It is an object of the present invention to provide a binary code converter that requires relatively few magnetic cores.

It is another object of the present invention to provide a binary code converter that requires a minimum of space and weight.

These and other objects are accomplished according to the principles of the invention by providing a magnetic core decoding means that enables readout of odd numbered digits when the magnetic cores are driven to saturation in one direction and readout of even numbered digits when the cores are driven to saturation in the opposite direction.

The principles and operation of the invention can be understood by referring to the following description and the accompanying drawings.

Figure 1:
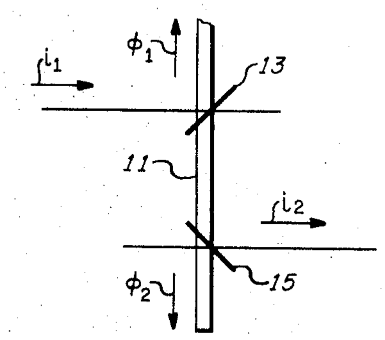
FIG. 1 is a diagram useful in explaining the invention.

The invention will be described by means of the "mirror" system of notation. This system is helpful in visualizing the polarity of induced voltages and the various flux relationships in a magnetic core. As shown in FIG. 1, a magnetic core is represented by a relatively heavy line 11. The various wires are represented by lines crossing this core at right angles. The oblique lines 13 and 15 are used to indicate that the wires are magnetically coupled to the core. Current-flux relationships may be visualized by imagining the oblique lines to be mirrors. According to convention, current approaching the core is reflected off the mirror to provide a resultant flux. Thus, in FIG. 1, a current approaching the mirror 13 as indicated will establish an upwardly directed flux in the core 11. This change in flux will induce a voltage in the second line which will cause a current to flow in that line in such a direction as to establish a downwardly directed flux in accordance with Lenz's law.

Figure 2:
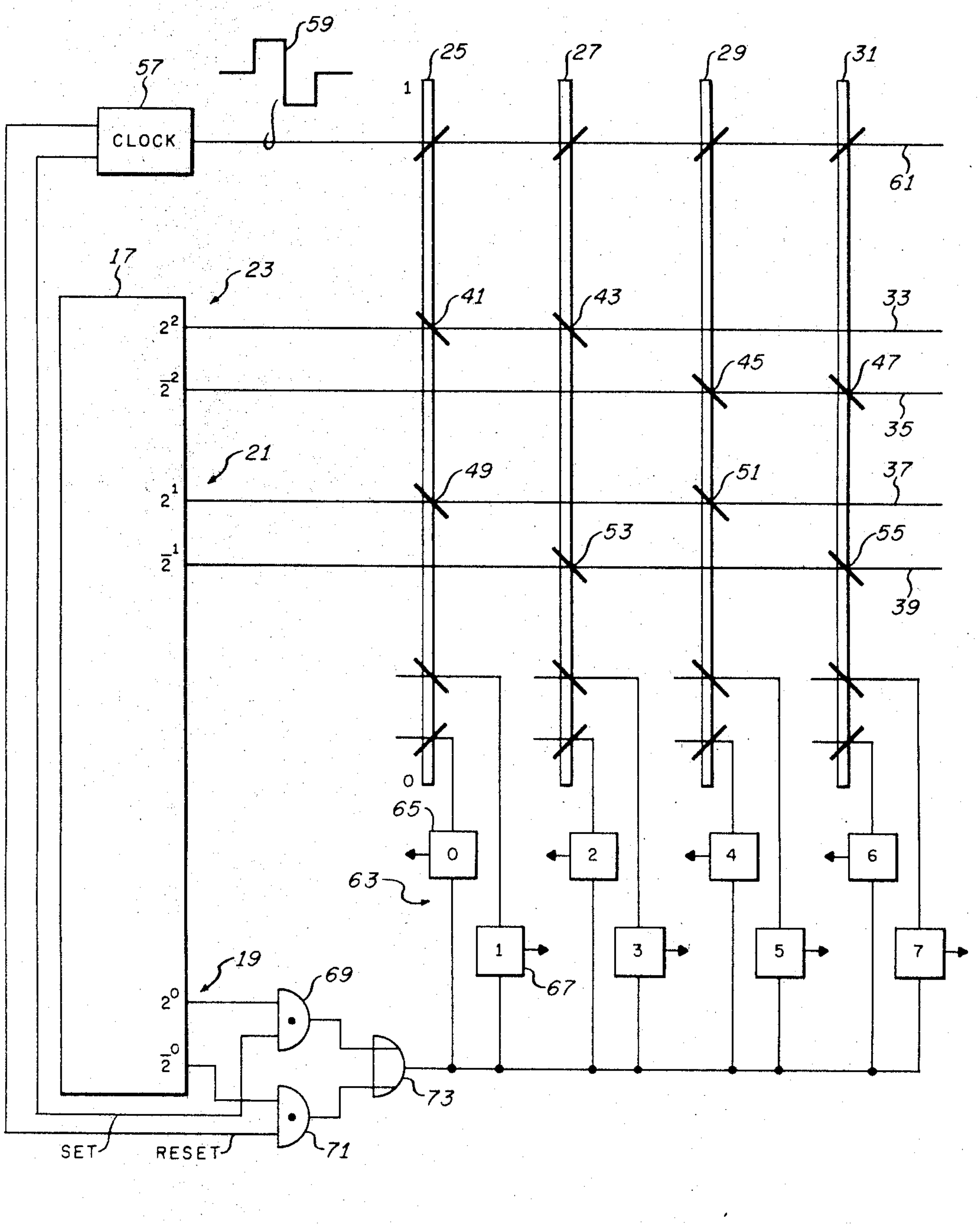
FIG. 2 is a diagram illustrating a presently preferred embodiment of the invention.

Referring now to FIG. 2, an input means 17 provides for parallel presentation of a three-bit binary code. This device may, for instance, be a register in which the incoming binary code word is stored temporarily. The binary state of the digits comprising the word are presented as true or complementary signals as the case may be. A signal representing the least significant digit is produced at a bit position 19. This is used as an enabling signal as will be explained later. Signals representing the more significant binary digits are produced at the bit positions 21 and 23. These signals are used as inhibiting signals.

Four magnetic memory cores 25, 27, 29, and 31 are provided for decoding the incoming word. These cores are constructed using a conventional square hysteresis loop material. The cores are coupled to the more significant bit positions of the input means through inhibit wires 33, 35, 37, and 39. The true inhibit wire 33 from the bit position 23 is coupled to the cores 25 and 27 at the points 41 and 43. This inhibit wire is not coupled to either core 29 or core 31. The complementary inhibit wire 35 is coupled to the core 29 at the point 45 and to the core 31 at the point 47. This inhibit wire, however, is not coupled to the core 25 or the core 27.

The true inhibit wire 37 from the bit position 21 is coupled to the cores 25 and 29 at points 49 and 51 respectively.

The complementary inhibit wire from the same bit position is coupled to the core 27 at the point 53 and to the core 31 at point 55.

It will be noticed that each core is magnetically coupled to receive a different combination of true and complementary signals from the various bit positions. Or stated as a corollary, each core is magnetically isolated from a different combination of true and complementary signals from the various bit positions. A clock means 57 provides a bidirectional pulse 59 in order to complete a conversion. This pulse is coupled to all of the magnetic cores by means of a clock wire 61.

A group of coincidence circuits 63 is coupled to the various magnetic cores so that each core has associated with it, a first coincidence circuit such as the circuit 65 which is responsive to a flux change in the downward direction and a second coincidence circuit 67 which is responsive to flux changes in the upward direction.

In FIG. 2, the various coincidence circuits each represent a different decimal number as indicated in the drawing. A coincidence circuit is available for each possible value of the incoming word to be decoded.

The least significant bit position 19 is connected to a pair of AND circuits 69 and 71. The AND circuit 69 is connected to receive true enabling signals from the bit position 19 and SET signals from the clock. The AND circuit 71 is connected to receive complementary enabling signals from the bit position 19 as well as RESET signals from the clock 57. The output of both AND circuits is applied to an OR circuit 73. The output of this OR circuit is applied to each of the coincidence circuits in the group 63.

Thus it can be seen that a given coincidence circuit will provide an output signal only when a flux change of a given direction in the associated core is accompanied by the proper combination of a given least significant bit signal and a given SET or RESET signal.

The inhibit signals from the input means 17 which are applied to the various magnetic cores are of sufficient magnitude so that any one of these signals is adequate to saturate a core in the downward direction.

The clock means 57 provides a signal which is adequate to saturate all of the cores in the downward direction when the clock signal is negative and in the upward direction when the clock signal is positive.

The circuit is prepared for operation by saturating all of the cores in the upward direction.

Assume that an incoming word is to be decoded and that this incoming word has a binary value of 000. Each of the bit positions 19, 21, and 23 will produce a complementary signal under these conditions. These complementary signals will saturate the cores 27, 29, and 31 in the downward direction. These signals, however, will not be coupled to core 25.

When the clock pulse 59 is applied to the cores, the negative portion of this pulse will attempt to saturate each of the cores in the downward direction. Since the cores 27, 29, and 31 are already saturated by the inhibit signals, the negative-going clock pulse will not affect these cores. The core 25, however, will be switched by this negative-going portion of the clock pulse. This change in flux cannot produce a signal to actuate the second coincidence circuit 67, but it can produce a signal to actuate the circuit 65.

The same negative-going pulse produces a RESET signal which is applied to the AND gate 71 together with the complementary signal from the bit position 19. The output of the gate 71 is applied through the OR gate 73 to enable all of the coincidence circuits. Since only the coincidence circuit 65 receives a signal from the memory cores at the same time as the signal from the gate 73, only the coincidence circuit 65 will produce an output signal.

When the clock 57 produces a positive-going signal this signal will attempt to saturate all of the cores in the upward direction. Since the cores 27, 29, and 31 are held in saturation by the inhibit signals from the bit positions 21 and 23, these cores can not be switched by the clock pulse. The core 25, however, will be switched by the positive-going portion of the clock pulse since no inhibit signals are being applied to this core. The resulting change in flux will cause a signal to appear at the second coincidence circuit 67. This portion of the clock pulse will also provide a SET signal at the input to the AND gate 69. Since the bit position is producing only a complementary signal at this time, however, neither the AND gate 69 nor the AND gate 71 can produce a signal to enable the coincidence circuit 67.

Thus it will be seen that only the first coincidence circuit 65 produces an output signal during the clock cycle. The output of the coincidence circuit 65 can thus be interpreted as indicating that the incoming signal to be decoded had a decimal value of "0."

It can be shown that each possible value of incoming signal will be represented by a unique output from a single coincidence circuit.

Suitable indicating means may be energized by the outputs of the various coincidence circuits to indicate which of these circuits has passed a signal during a given clock cycle.

Although only a three-bit code has been illustrated in FIG. 2, it will be appreciated that any code having more than one bit may be converted by the same technique.

In general, an $n$-bit code will require the use of $2^{n-1}$ magnetic memory cores. This will provide a separate core for each possible combination of true and complementary inhibit signals, so that a different core can be magnetically isolated from each possible combination of inhibit signals. Only the isolated core will be switched during a given clock cycle.

Any given combination of inhibit signals, however, may represent one of two successive numbers depending upon the binary value of the signal from the least significant bit position. Thus, any given core is used to decode two numbers, so that only one half the number of cores required in the prior art devices is necessary in the present invention.

It will be appreciated that many variations of the enabling circuit of FIG. 2 are possible. In some instances, for example, it may be preferable to provide enabling means that will supply enabling signals to only the even-valued coincidence circuits in response to a complementary signal from the bit position 19 and an enabling signal to only the odd-valued coincidence circuits in response to a true signal from that bit position.

One convenient readout method that may be used with the present invention involves the use of cold cathode numerical indicator tubes. Such tubes characteristically contain a common anode and separate cathode for each number to be displayed. Applying a voltage to a given cathode causes the corresponding number to appear in the form of a gas discharge.

Figure 3:
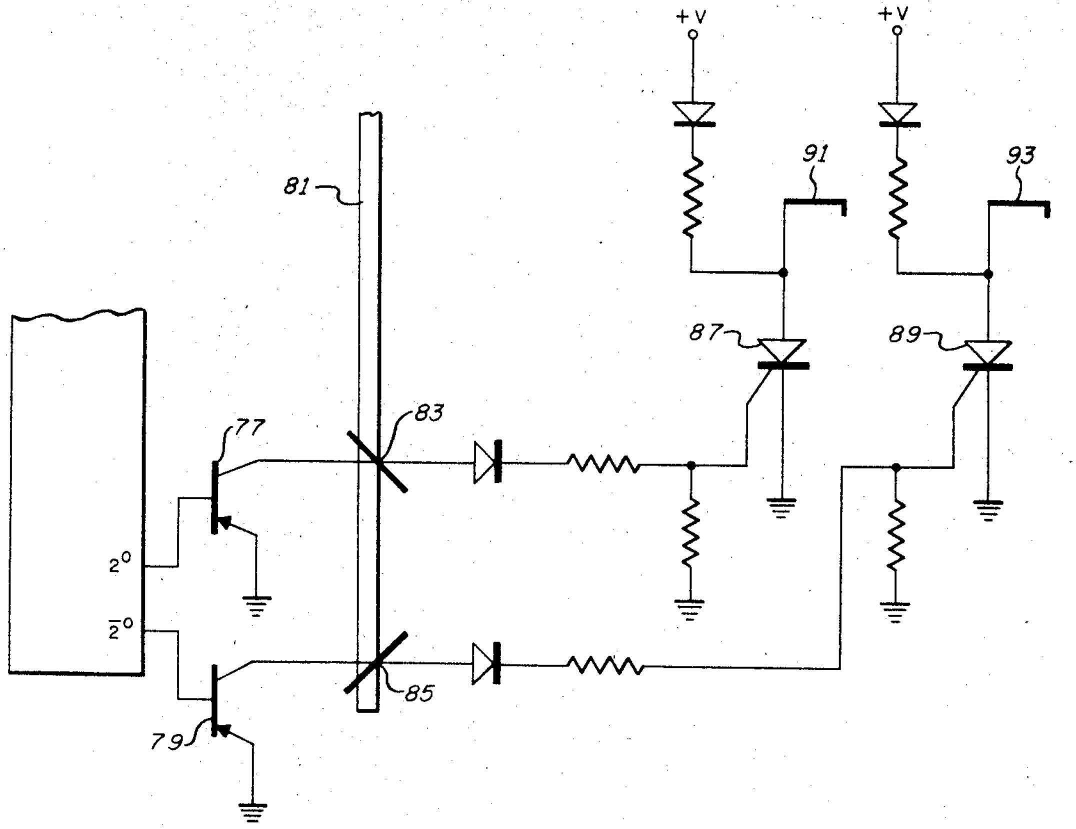
FIG. 3 is a diagram illustrating one method for providing signals suitable for use with conventional cold cathode numerical readout tubes.

FIG. 3 illustrates a specific enabling means that may be used with such numerical indicator tubes. True or complementary signals from the least significant bit position are used to saturate the pnp transistors 77 and 79 respectively. The outputs of these transistors are coupled to a magnetic memory core 81 at the points 83 and 85. A true enabling signal is coupled to a first silicon controlled rectifier 87 through a suitable network whereas a complementary enabling signal is coupled through a suitable network to a second silicon controlled rectifier 89.

The cathodes 91 and 93 represent two cathodes of a numerical indicator tube (not shown). The anodes of the silicon controlled rectifiers are connected to positive voltage sources through suitable diode-resistor networks that maintain the silicon controlled rectifiers in the conducting state after they have been triggered. When either silicon controlled rectifier is triggered, it effectively connects the associated cathode of the numerical indicator tube to ground and permits a corresponding number to be displayed.

The transistors 77 and 79 act as coincidence circuits that permit a switching signal to pass to the associated silicon controlled rectifier when enabled by a suitable true or complementary signal.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A decoder for $n$-bit binary words comprising a plurality of $2^{n-1}$ magnetic memory cores; clock means for applying a magnetizing force to all cores alternately in a first and a second direction; means to permit flux reversal in only a single selected core representative of the binary values of all digits other than the least significant in the incoming word; individual coincidence means coupled to each core to detect the direction of any flux reversal in that core; means responsive to the binary value of the least significant digit in the incoming word to enable said coincidence means during a flux reversal; and means to indicate which coincidence means has passed a signal.

2. A decoder for incoming $n$-bit binary words comprising a plurality of $2^{n-1}$ magnetic memory cores; a source of bidirectional clock pulses for applying a magnetizing force to all cores alternately in a first and a second direction; enabling means to provide a signal representative of the binary value of the least significant digit in an incoming word; inhibiting means to permit flux reversal in only a single selected core representative of the binary value of all remaining digits in the incoming word; individual coincidence means coupled to each core to detect the direction of any flux reversal in that core; means to apply a signal from said enabling means to the coincidence means during the occurrence of a clock pulse; and means to indicate which coincidence circuit has passed a signal during a clock pulse.

3. A decoder for an $n$-bit binary number comprising a plurality of $2^{n-1}$ magnetic memory cores; clock means to magnetize all of the cores in alternate directions; first and second coincidence circuits coupled to each core so as to receive signals when the core is switched in the first and second directions respectively, input means to provide true and complementary signals corresponding to the binary value of each bit in the incoming word; means to enable said first and second coincidence circuits in response to the binary value of the true and complementary signals corresponding to the least significant bit of the incoming word; means to inhibit switching in selected cores determined by the combination of true and complementary signals from the more significant bits in the incoming word; and means to indicate which coincidence circuit passes a signal during a clock cycle.

4. A binary decoder comprising an input means for providing true and complementary signals at individual bit positions corresponding to the value of each bit in the number to be decoded; first and second enabling wires connected to receive true and complementary signals respectively from the least significant bit position; individual pairs of inhibit wires connected to receive true and complementary signals respectively from each bit position other than the least significant; a magnetic memory core for each possible combination of signals on the inhibit wires; means for magnetically coupling each memory core to a different combination of true and complementary inhibit wires, each of said coupling means being adequate to saturate a memory core in a given direction; a first and a second coincidence circuit coupled to each memory core so as to receive a switching signal in response to flux changes in said given direction and in the opposite direction respectively; means to enable said first and second coincidence circuits in response to signals on said first and second enabling wires respectively; clock means to supply a saturating magnetic force to all cores in said first direction and then in the opposite direction; and means to indicate which coincidence circuits pass a signal during a clock cycle.

5. A decoder for an $n$-bit binary number comprising a plurality of $2^{n-1}$ magnetic memory cores; clock means to apply a magnetizing force to the cores in the binary ZERO direction and then in the binary ONE direction; first and second coincidence circuits coupled to each memory core so as to respond to changes in flux in the binary ONE and binary ZERO directions respectively; input means to supply true and complementary signals corresponding to each bit position in the number to be decoded; means to enable said first and second coincidence means in response to true and complementary signals respectively in the least significant bit position of the input means; true and complementary inhibit wires connected to each bit position other than the least significant; means for magnetically coupling each memory core to a different combination of inhibit wires, said magnetic coupling being adequate to saturate a core in the binary ZERO state when the associated inhibit wire is energized; and readout means to indicate which coincidence circuits pass a signal during a clock cycle.

6. A decoder for an $n$-bit binary number comprising a plurality of $2^{n-1}$ magnetic memory cores; clock means to magnetize the cores in a binary ZERO direction and then in a binary ONE direction; a pair of coincidence circuits for each memory core, said pairs each containing a first coincidence circuit coupled to receive a switching signal when the associated core is switched to the binary ONE state and a second coincidence circuit coupled to receive a switching signal when the associated core is switched to the binary ZERO state; input means to provide true and complementary signals for each bit in the signal to be decoded; means to enable each of said first coincidence circuits in response to a true signal from the least significant bit position of the input means; means to enable each of said second coincidence circuits in response to a complementary signal from the least significant bit position of the input means; true and complementary inhibit wires connected to each bit position other than the least significant on the input means; means for magnetically coupling each memory core to a different combination of inhibit wires, said magnetic coupling means being adequate to saturate the core in the binary ZERO state when the associated inhibit wire is energized; and readout means to indicate which coincidence circuits pass a signal during a clock cycle.

7. A decoder for $n$-bit words comprising means to provide true and complementary enabling signals indicative of the binary state of the least significant bit of the incoming word; means to provide individual true and complementary inhibit signals indicative of the binary state of the more significant bits in the incoming word; a plurality of $2^{n-1}$ magnetic memory cores; first and second coincidence circuits magnetically coupled to each memory core, said first and second circuits being coupled to respond to flux changes in the first and second directions respectively; clock means to apply magnetomotive forces to all memory cores in the first and then the second directions; means to couple said inhibit signals to selected memory cores so that a different combination of true and complementary inhibit signals may be applied to each core; means to apply true enabling signals to the coincidence circuits during the first half of the clock cycle and complementary enabling signals to the coincidence circuits during the second half of the clock cycle; and means to indicate which coincidence circuits passed a signal during the entire clock cycle.

8. A decoder for $n$-bit binary words comprising input means to provide true and complementary signals corresponding to the binary value of each bit in the incoming word; a plurality of $2^{n-1}$ magnetic memory cores; first and second coincidence circuits for each memory core, said coincidence circuits being coupled to receive signals when the associated core is driven to the binary ONE or binary ZERO states respectively; means to enable said coincidence circuits in response to the true and complementary saturating signals representing the least significant bit in the incoming word; coupling means for saturating selected memory cores in response to the true and complementary signals representative of all binary digits other than the least significant, said coupling means being arranged so that each memory core can respond to only one of the different possible combinations of these true and complementary signals; clock means adequate to drive all cores to the binary ZERO state and then to the binary ONE state; and means to indicate which coincidence circuits have passed a signal during a readout cycle.

9. A decoder for three-bit binary words comprising four magnetic cores; clock means to provide alternate SET and RESET pulses; coupling means to produce a magnetizing force in a first direction in all cores in response to a RESET pulse and in a second direction in all cores in response to a SET pulse; means to provide true and complementary enabling signals in accordance with the binary value of the least significant digit of the incoming word; means to provide individual true and complementary inhibiting signals in accordance with the binary value of each of the digits other than the least significant on the input means; means for magnetically coupling the most significant true inhibiting signal to the first and second of said magnetic cores; means for magnetically coupling the most significant complementary inhibiting signal to the third and fourth of said cores; means for magnetically coupling the true inhibiting signal of intermediate significance to the first and third of said cores; means for magnetically coupling the complementary inhibiting signal of intermediate significance to the second and fourth of said cores; individual pairs of first and second coincidence means coupled to each core, said coincidence means being coupled so that flux changing in the first or second directions in the core passes a signal to the first or second coincidence circuit respectively; means to couple a complementary enabling signal to all of said first coincidence means in response to a RESET pulse; means to couple a true enabling signal to all of said second coincidence means in response to a SET pulse; and means to provide an indication of which coincidence means pass a pulse.

10. A decoder for 3-bit binary words comprising four magnetic cores; clock means for applying a magnetizing force to all cores in a first and then in a second direction; means to provide true and complementary enabling signals in accordance with the binary value of the least significant digit of the incoming word; means to provide individual true and complementary inhibiting signals in accordance with the binary value of each of the digits other than the least significant in the incoming word; means for magnetically coupling the most significant true inhibiting signal to the first and second of said magnetic cores; means for magnetically coupling the most significant complementary inhibiting signal to the third and fourth of said cores; means for magnetically coupling the true inhibiting signal of intermediate significance to the first and third of said cores; means for magnetically coupling the complementary inhibiting signal of intermediate significance to the second and fourth of said cores; individual pairs of first and second coincidence means coupled to each core, said coincidence means being coupled so that flux changing in the first or second directions in the core passes a signal to the first or second coincidence circuit respectively; means to couple a complementary enabling signal to said first coincidence circuits while the clock means is providing a magnetizing force in the first direction; means to couple a true enabling signal to said second coincidence circuits while the clock means is providing a magnetizing force in the second direction; and means to couple a cold cathode numerical indicator tube to said coincidence circuit so that each coincidence circuit can initiate the display of a corresponding numeral.

References Cited

UNITED STATES PATENTS

| | | | |
|---|---|---|---|
| 2,846,671 | 8/1958 | Yetter | 340—347 |
| 3,141,158 | 7/1964 | Minnick et al. | 340—347 |
| 3,141,159 | 7/1964 | Lee | 340—347 |

MAYNARD R. WILBUR, *Primary Examiner.*

JEREMIAH GLASSMAN, *Assistant Examiner.*